July 10, 1951  A. VAN RYAN ET AL  2,560,529
AUTOMATIC RECLOSING CIRCUIT BREAKER
Filed March 23, 1944  10 Sheets-Sheet 1

INVENTORS
ANTHONY VAN RYAN
CARL SCHINDLER
BY
Arthur R. Woolfolk
ATTORNEY.

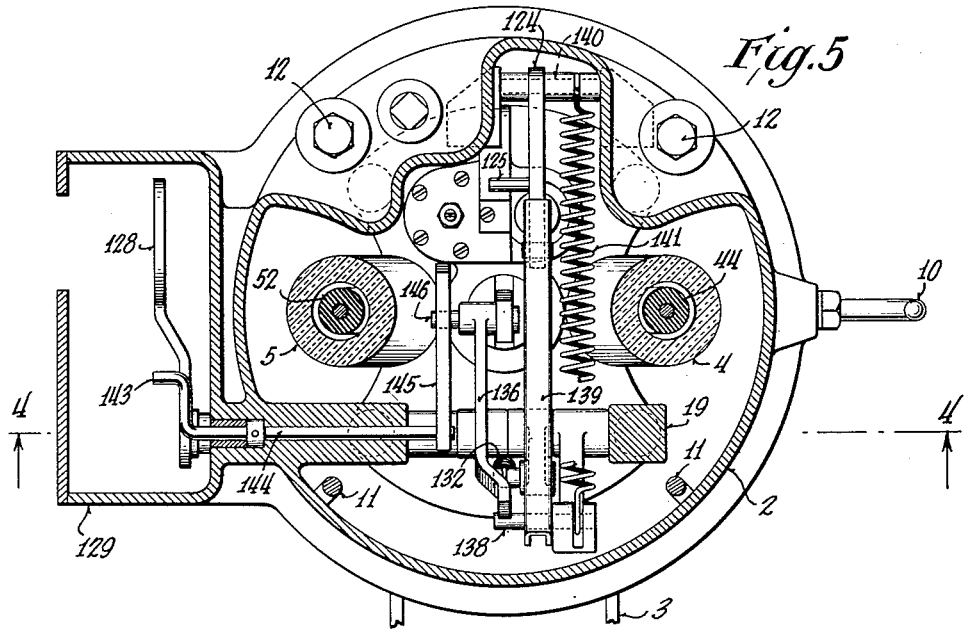

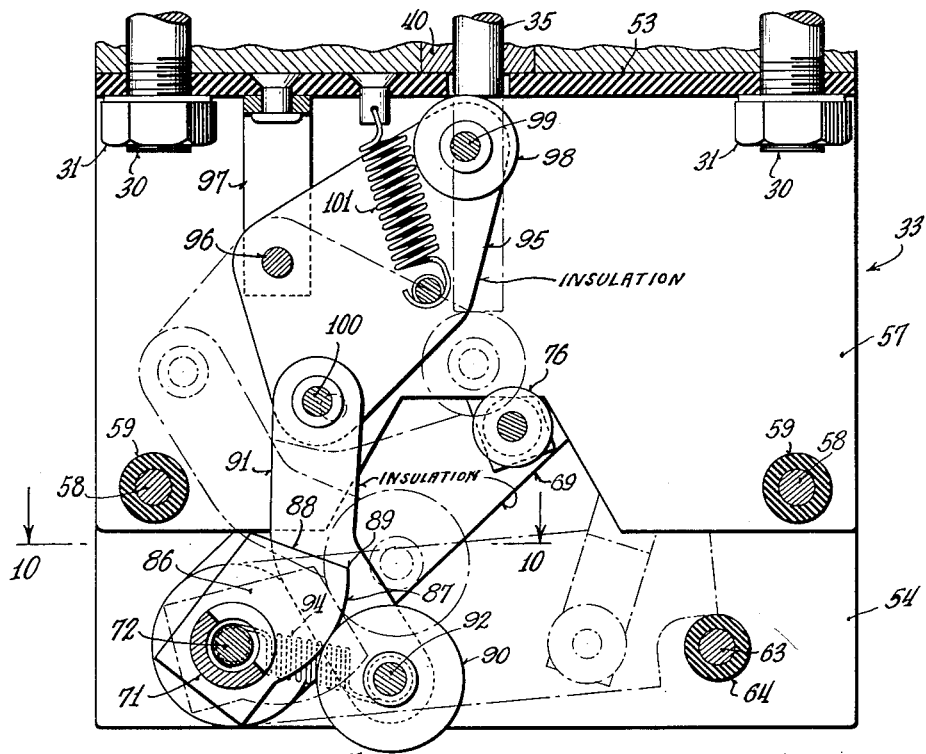

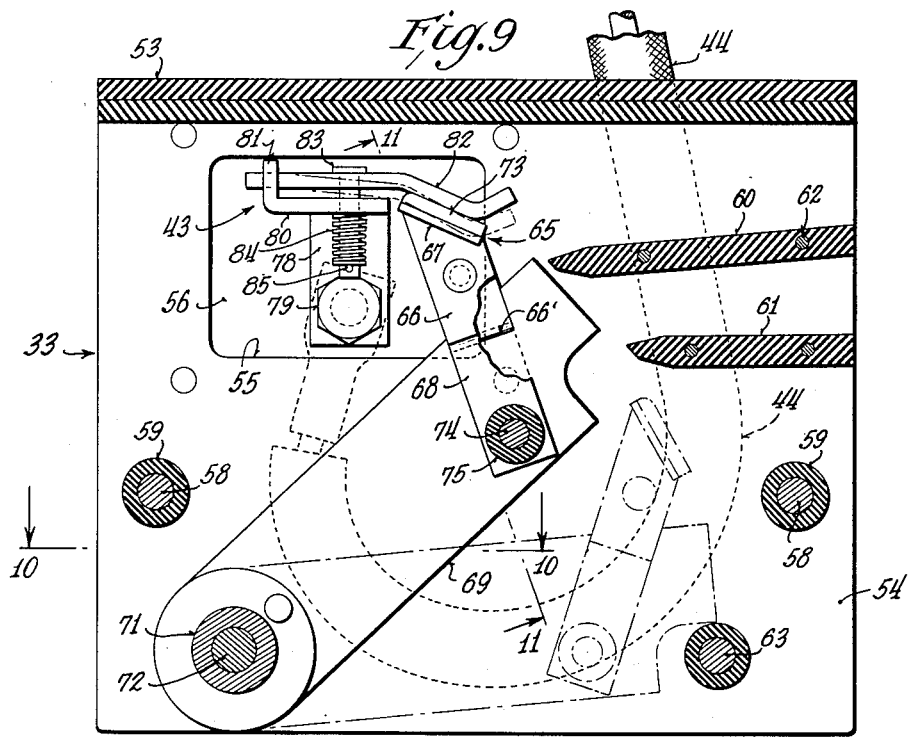

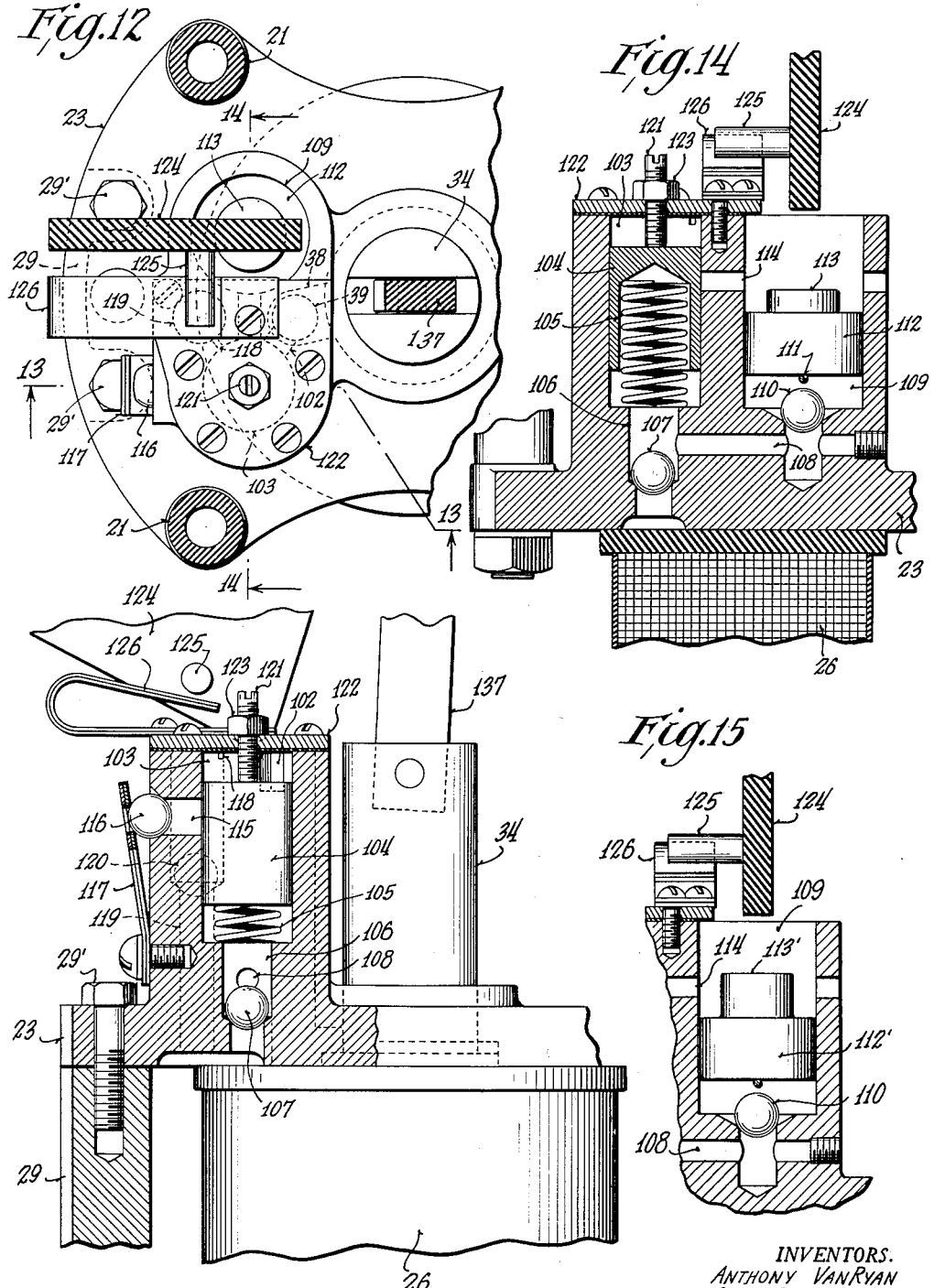

July 10, 1951　　　A. VAN RYAN ET AL　　　2,560,529
AUTOMATIC RECLOSING CIRCUIT BREAKER
Filed March 23, 1944　　　　　　　　　　　　10 Sheets-Sheet 10
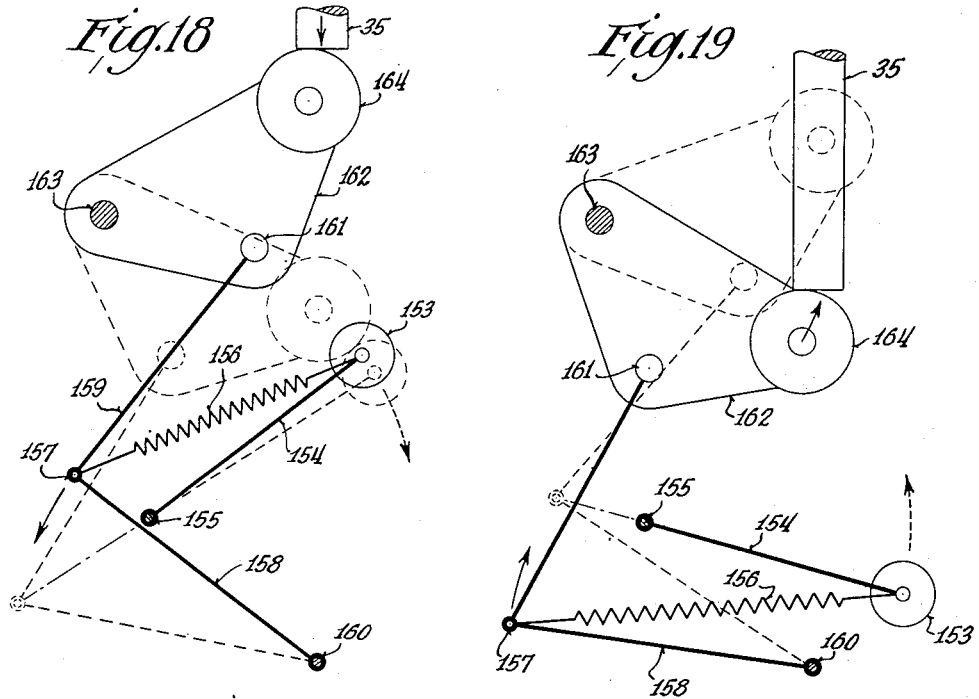
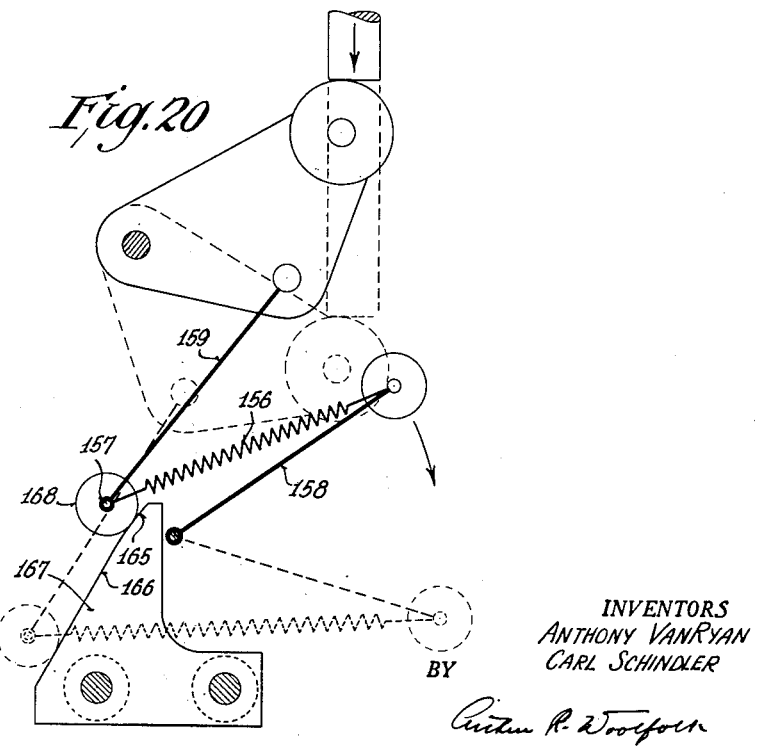
INVENTORS
ANTHONY VAN RYAN
CARL SCHINDLER
BY
ATTORNEY.

Patented July 10, 1951

2,560,529

UNITED STATES PATENT OFFICE 2,560,529

AUTOMATIC RECLOSING CIRCUIT BREAKER

Anthony Van Ryan, South Milwaukee, and Carl Schindler, Wauwatosa, Wis., assignors to McGraw Electric Company, a corporation of Delaware Application March 23, 1944, Serial No. 527,724

13 Claims. (Cl. 200—89)

This invention relates to an automatic reclosing circuit breaker and is particularly directed to a circuit breaker which is adapted to be placed in a distribution system ahead of several fused sections of the line.

In distribution systems of the type hereinabove set forth it frequently happens that a fault occurs on a branch line and that this fault is, in the majority of the cases, only a temporary fault. However, if no provision is made to take care of such a condition, the fuse protecting such branch line would immediately blow and the service would be interrupted on the branch line until the fuse was replaced by a lineman.

This invention is designed to overcome the above noted defects, and objects of this invention are to provide an automatic reclosing circuit breaker which may be placed ahead of several fused sections in a distribution system, and which is so arranged that it will have at least a first quick response to overload followed by a delayed reclosing and subsequent responses, the device in the subsequent responses having approximately the time current characteristic of a fuse and thus being coordinated with the fuses in the distribution system associated with the circuit breaker.

In greater detail, objects of this invention are to provide an automatic reclosing circuit breaker which under the conditions hereinabove set forth will first quickly open and thus protect the fuse on the branch line where the fault occurred, if the fault is temporary, and in subsequent operations will have substantially the time current characteristics of a fuse, thereby allowing the fuse in the branch line, in the event the fault persists, to blow and in this manner preventing repeated or permanent interruption of the service on other sections of the system protected by the circuit breaker.

Further objects are to provide an automatic repeating circuit breaker which will respond to an overload and will again close after a predetermined interval, which will lock out after a predetermined number of operations if they occur in sufficiently rapid succession, but which will reset itself for the full number of operations if they occur at sufficiently spaced intervals, which is provided with biasing means temporarily restrained and released for lock-out action after a predetermined number of operations occurring in rapid succession, which may be manually tripped and manually reset, and which will indicate when it has been locked out, and which is free for automatic operation even while it is being manually reset.

Further objects are to provide a circuit breaker which has a quick opening and a quick closing stroke for the contacts whether it is automatically or manually operated, and in which a magnetically urged plunger initiates the opening stroke of the contacts when the plunger is traveling at its highest rate of speed, spring means being provided for maintaining or even increasing the speed of travel of the movable contacts after the initial portion of their opening stroke, the spring means also being effective in securing a very quick closing stroke independently of the speed at which the plunger is retracted.

Further objects are to provide an automatic reclosing circuit breaker which is oil immersed and mounted in a metal can or housing open at the top, in which the operating parts are suspended from a metal top for the can and can be readily removed without disturbing the can and which is so constructed that it has hydraulic time delay and cumulative lock-out means.

Further objects are to provide an automatic reclosing circuit breaker which may be adjusted to have either one quick opening stroke followed by an opening operation having characteristics approximating that of a fuse, or which may have two or more quick opening strokes depending on the requirements of the user, with subsequent actions following the time current characteristics of a fuse, or which may be adjusted so that all of its operations have the time current characteristics of a fuse, which may be so designed that any time delay desired may be obtained before the circuit breaker recloses, in which the parts are readily replaced with other parts to adapt the circuit breaker for different current ratings, in which different time current characteristics may be obtained for subsequent operations of the circuit breaker by adjustment of the parts for a certain range and by a suitable selection and interchange of certain parts of the apparatus for a greater range, and in which the utmost ease is afforded in changing parts of the circuit breaker, the construction being such that free access may be had to any of the parts of the circuit breaker.

Further objects are to provide a circuit breaker which is so made that it has a pronounced arc extinguishing action without necessitating the use of a blow-out magnet, in which means are provided for quickly interrupting the arc resulting from opening the circuit breaker, and in which the arc is magnetically blown outwardly against baffles and thus quickly extinguished.

Further objects are to provide a novel form of contact assembly which forms a complete and separate assembly in itself, which may be removed as a unit from the circuit breaker and another contact assembly substituted therefor without disturbing other portions of the circuit breaker, and which, though operated by a magnetic plunger in the main body of the circuit breaker, nevertheless is not mechanically connected to the magnetic plunger.

Further objects are to provide a contact assembly in which the contacts have not only a quick opening motion but also have a quick closing motion to minimize wear on the contacts, and in which the quick closing motion is obtained independently of the speed of retraction of the magnetic plunger.

Further objects are to provide a circuit breaker which is easy to produce and easy to assemble, which may be readily partially disassembled to allow substitution of different portions of the circuit breaker, and which is so designed that all of the parts may be readily inspected without dismantling the circuit breaker.

Embodiments of the invention are shown in the accompanying drawings, in which:

Figure 5 is a sectional view on the line 5—5 of Figure 4.

Figure 6 is a fragmentary side elevation of the upper portion of the circuit breaker with a part broken away.

Figure 7 is a sectional view on the line 7—7 of Figure 8 showing in full lines the position of the parts when the switch is closed and in dotted lines the position of the parts when the switch is open.

Figure 8 is an end view of the contact assembly with parts broken away and in section.

Figure 9 is a sectional view on the line 9—9 of Figure 8, such view showing the switch in closed position in full lines and in open position in dotted lines.

Figure 10 is a fragmentary sectional view on the line 10—10 of Figures 7 and 9.

Figure 11 is a fragmentary sectional view on the line 11—11 of Figure 9.

Figure 12 is a fragmentary sectional view on the line 12—12 of Figure 2.

Figure 13 is a sectional view on the line 13—13 of Figure 12.

Figure 14 is a sectional view on the line 14—14 of Figure 12.

Figure 15 is a fragmentary view corresponding to a part of Figure 14 showing a modified form of the invention.

Figure 18 is a diagrammatic view showing the position of the parts in full lines when the switch is closed and showing in dotted lines the position the parts assume during the initial portion of the opening stroke of the switch.

Figure 19 is a view showing in full lines the position of the parts when the switch is opened and in dotted lines the position of the parts just prior to the initiation of the motion of the switch towards closed position.

Figure 20 is a diagrammatic view showing a modified form of the invention, such view showing in full lines the position of the parts when the switch is closed and in dotted lines the position of the parts when the switch is open.

Figure 1:
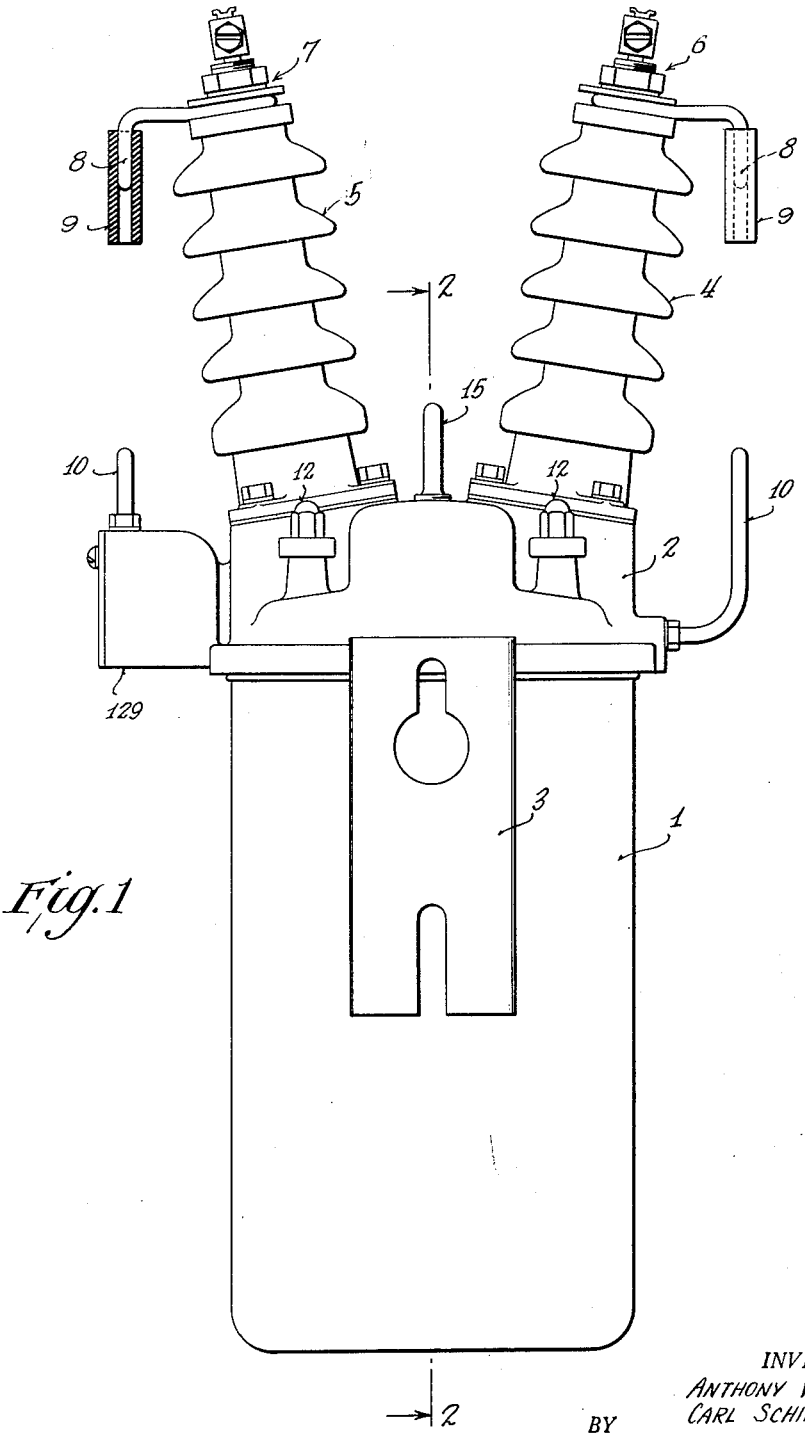
Figure 1 is an elevation, partly in section, showing the circuit breaker.
Figure 2:
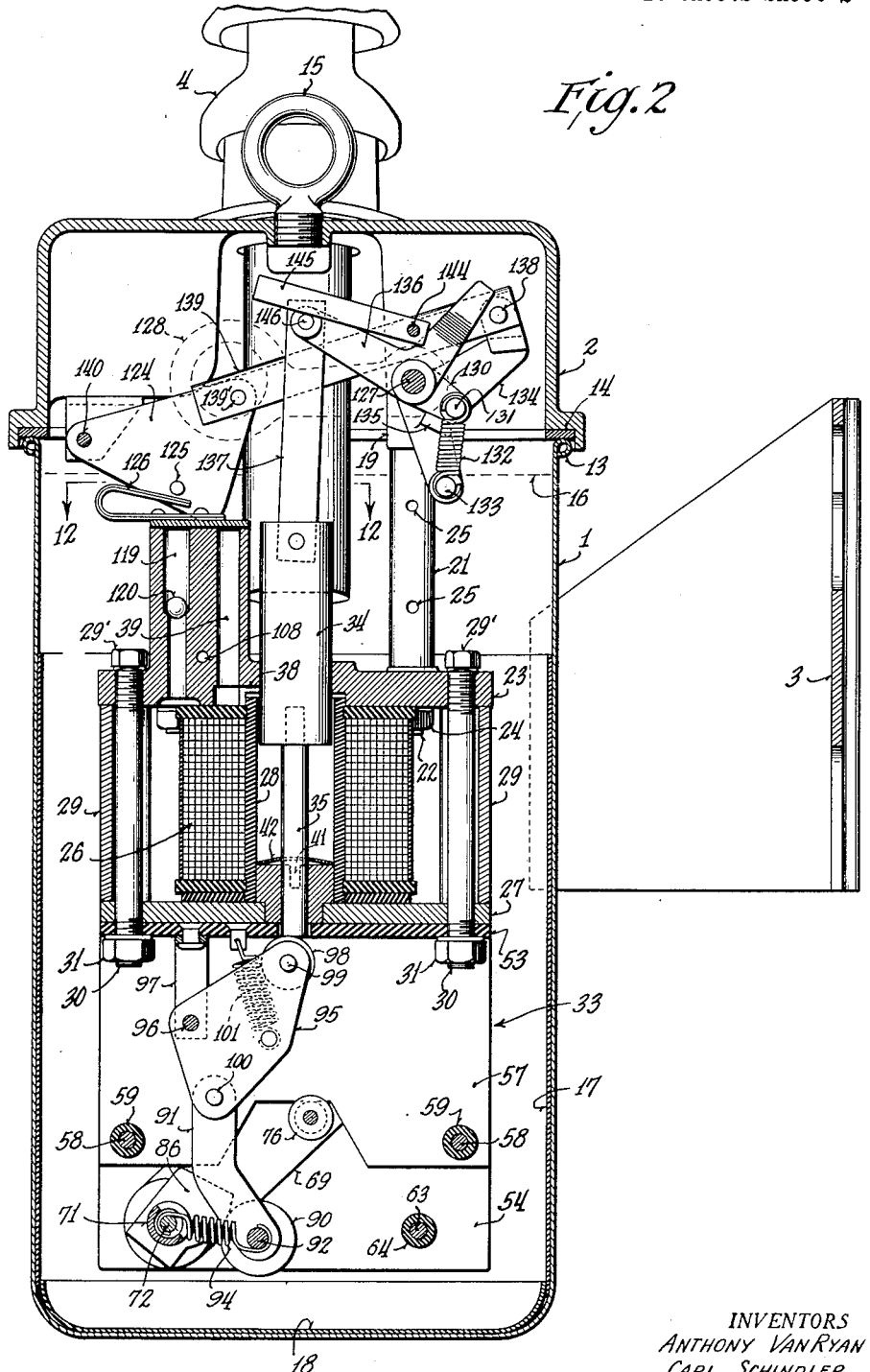
Figure 2 is a sectional view on the line 2—2 of Figure 1 showing the circuit breaker in closed position.

Referring to the drawings, particularly Figure 1, it will be seen that the circuit breaker comprises a metal can 1 and a metal cover 2. The can is provided with a bracket 3 so that it may be attached to a suitable support. The cover carries the insulators 4 and 5 which respectively carry the line and load terminals indicated generally at 6 and 7. Each of these terminals is provided with a conductor 8 having a downwardly extending portion housed in the upper part of a fiber tube 9. Upwardly extending conductors 10 are carried by the cap and are located immediately below the corresponding conductors 8 to provide spark gaps whose breakdown value is lower than the flashover value of the insulators 4 and 5. The top 2 is securely attached to the tank or can 1 by means of a plurality of bolts 11, see Figure 5, secured to the inner side of the can and extending upwardly and having threaded upper ends upon which the clamping nuts 12 are screwed, suitable gaskets, not shown, being positioned between the nuts and the adjacent portions of the top 2 in accordance with the usual practice. The upper portion of the can or tank 1 is provided with a beaded upper edge 13 and a gasket 14 is positioned between the cover or cap 2 and the beaded upper edge 13 of the can 1, such cover having an overhanging skirt portion as shown in Figure 2. The cover or top 2 is provided with an eyelet 15 adapted to receive a hoisting line so that the circuit breaker may be readily hoisted into position.

Figure 3:
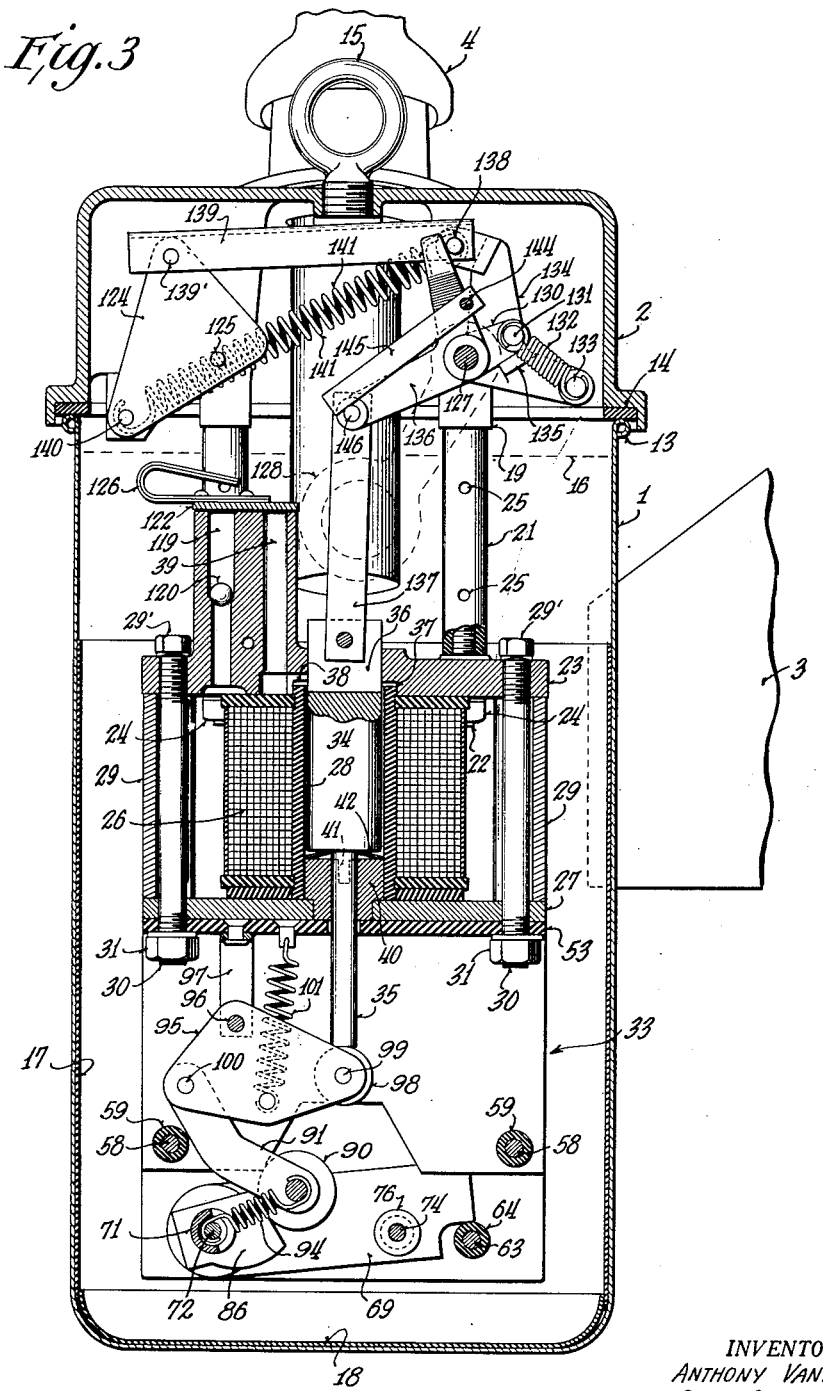
Figure 3 is a view corresponding to Figure 2 showing the circuit breaker in open position and in locked out position.
Figure 4:
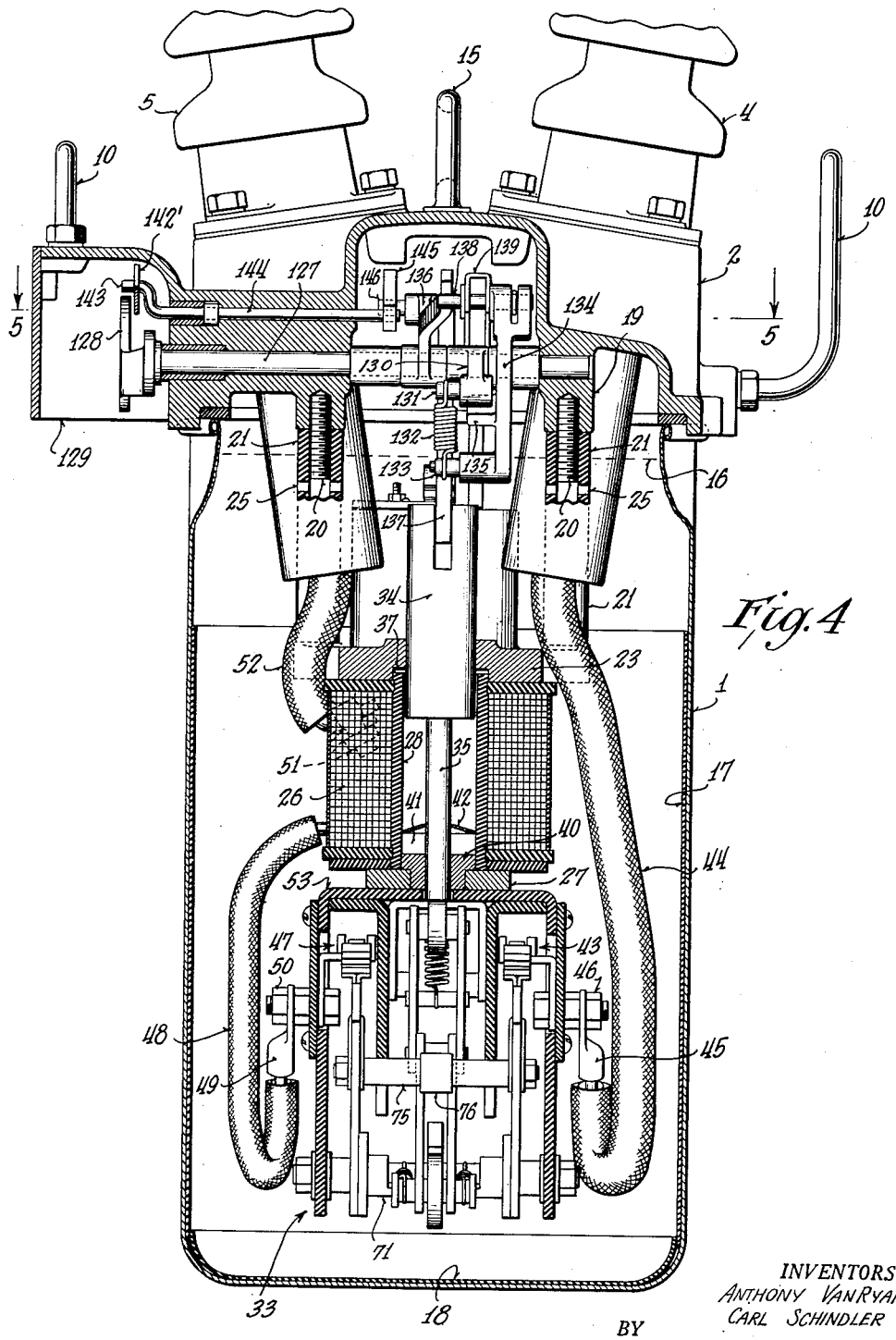
Figure 4 is a sectional view on the line 4—4 of Figure 5.

All of the working parts of the circuit breaker are suspended from and carried by the cap or cover 2 as is apparent from an examination of Figures 2, 3 and 4, and the can 1 is filled with oil up to the dotted line 16.

The can is imperforate and is open only at its top so that there is no chance of leaking of the oil from the can. It is preferable to line the major portion of the can with a fiber sheet lining as indicated at 17 and 18.

All of the working parts of the circuit breaker are suspended directly from the metal top 2. This top is provided with a plurality of downwardly projecting lugs 19 which are internally threaded and receive screw threaded studs 20, as shown in Figure 4. Tubular insulating supporting pillars 21 are internally threaded at both ends and are screwed on the screw threaded studs 20. The lower ends of these pillars receive screws 22, see Figure 3, which pass through the body portion 23 of an electromagnetic device, such body portion being held in place by means of nuts 24 screwed on the screws 22, as shown in Figure 3.

It is preferable to provide the insulating pillars 21 with spaced openings 25 to allow circulation of the oil therethrough to prevent the formation of air spaces and to thus increase the insulating characteristics of the pillars. The head portion 23 of the electromagnetic device is formed of magnetic material and a solenoid or energizing winding 26 is positioned below the head portion and detachably held in place by means of a bottom magnetic member 27, suitable insulation surrounding the coil 26 and being interposed between such coil and the portions 23 and 27. The coil itself is wound about an insulating sleeve or cylinder 28. Magnetic spacer members 29 are positioned between the members 23 and 27. Cap screws 29', see Figure 13, extend through the member 23 and into the upper portion of the members 29. Bolts or screws 30 provided with clamping nuts 31 are screwed into the member 23 and carry the nuts 31 at their lower side. The shape of the members 29 is shown in dotted lines in Figure 12. The bolts 30 also hold an upper insulating portion 53 of a unitary switch assembly indicated generally at 33 in place.

A magnetic plunger 34 loosely slides within the insulating sleeve 28 and is provided with a non-magnetic plunger or extension 35 rigidly carried by the magnetic main portion 34 of the plunger. The upper portion of the plunger is slotted as indicated at 36.

It is to be noted that the sleeve 28 has its upper portion fitted within an annularly recessed part 37 in the head or body portion 23 of the device. This recessed portion 37 communicates by means of a transverse passage 38 with an upwardly extending passage 39, see Figures 2, 3 and 12.

It is to be noted that the magnetic plunger 34 slides through the magnetic portion 23 and therefore the plunger 34 is covered with a non-magnetic plating. It is also to be noted that the non-magnetic plunger 35, which is rigid with the magnetic plunger 34 and forms a continuation thereof, freely passes through a magnetic plug 40 which fits within the fiber or insulating sleeve 28 and also has a reduced portion that fits within the lower magnetic member 27. Thus it is apparent that a magnetic yoke portion is provided externally of the energizing winding or coil 26 and that when current is passing through the coil there is a tendency to pull the magnetic plunger 34 downwardly from the position shown in Figure 2 to the position shown in Figure 3.

It is to be noted that the magnetic plug 40, as will be seen from Figures 3 and 4, is provided with a transverse slot 41 in order to reduce eddy currents. This slot may extend downwardly as far as desired. It is to be noted also that a bowed spring washer 42 is provided and rests upon the plug 40 and acts as a cushion for the plunger at the lower portion of its stroke, oil being trapped beneath the washer 42 and serving to cushion the blow of the plunger at the final portion of its stroke. It is to be noted also that the slot 36 in the upper end of the plunger 34 allows free discharge of the oil when the plunger is nearing the final portion of its stroke, thus allowing the plunger to acquire considerable additional speed for the last portion of its stroke. The purpose of this will be seen as the description proceeds for it is at the latter portion of the stroke of the plunger that the contacts are first separated and consequently the speed of the initial portion of the separating stroke of the contacts is high. This speed of opening of the contacts, as will be seen as the description proceeds, is maintained or even increased by spring means.

It is to be noted that the insulating bushings 4 and 5 have extensions that project downwardly into the can 1, as shown most clearly in Figure 4. It is also to be noted that the line terminal 6, see Figure 1, is connected directly with one of the stationary contacts indicated generally at 43 in Figure 4 by means of an insulated conductor 44. This conductor is provided with a terminal member 45 which is clamped in place by means of a removable nut 46. The other stationary terminal of the switch means indicated generally at 47 in Figure 4 is connected to one end of the coil 26 by means of the insulated conductor 48, such conductor having a terminal portion 49 which is removably held in place by means of the nut 50. The other end of the coil 26 is connected by means of a suitable connector indicated generally at 51 to an insulated conductor 52 which extends upwardly to the load terminal 7, see Figures 4 and 1.

The switch assembly is a unitary structure and is adapted to be positioned and removed as a unit. It is detachably held to the body portion 23, see Figure 3, by means of the bolts 30 and nuts 31. It is readily removable by merely removing the nuts 31 and detaching the conductors 44 and 48, see Figure 4. It is to be noted particularly that no portion of the switch mechanism is mechanically connected to the plunger. The plunger merely bears downwardly upon a portion of the switch mechanism and therefore it is not necessary to remove any links, levers or other members before the switch assembly can be removed as a unit.

The switch assembly can be best understood from reference to Figures 7 through 10. The switch assembly includes the transverse upper portion 53 of insulating material having downwardly turned side walls 54 provided with apertures 55 which are closed by removable insulating plates 56. These plates carry the stationary contacts 43 and 47 and the apertures 55 are large enough to allow the ready removal of the stationary contacts therethrough for inspection or renewal. Intermediate insulating partitions 57 are spaced inwardly from the side walls 54, as shown most clearly in Figure 8, and held in place by means of transverse pins 58 provided with suitable insulating spacer sleeves 59, see Figures 7 and 8. Insulating baffles 60 and 61 are positioned between the side walls 54 and the intermediate partitions 57 and are held in place in any suitable manner, as by means of pins 62, see Figure 9. It is preferable to form the housing 53, 54 and the intermediate partitions 57 and the baffles 60 and 61 of the switch assembly of fiber, though other insulating materials could be used.

The lower portion of the walls 54 are joined by means of a transverse pin 63 provided with an insulating spacer sleeve 64. This pin and spacer sleeve, as will be seen from Figure 9, constitutes a stop for limiting the downward motion of the movable switch contacts. The movable switch contacts are indicated generally by the reference character 65, see Figures 9 and 11. They comprise a pair of side plates 66 which have laterally turned slanting upper portions 67 and which have spaced lower portions 68, see Figure 11, such lower portions being secured to an insulating lever or arm 69, such arm being rigidly attached to flanged portions 70 of a sleeve 71 which has a cut away central portion, as shown in Figure 10. The sleeve is mounted for rotation on a pin or shaft 72 which is supported by the side walls 54. Two of these movable contacts are provided, as shown in Figure 8, and the upper faces of these movable contacts, as will be seen from Figures 9 and 11, are provided with wear pads or contact faces 73. The movable contacts 65 are electrically connected together by means of the conducting rod 74, such rod being provided with an insulating spacer 75 provided with an enlarged central portion 76, as shown in Figure 8. The rod 74 is threaded at its ends and receives the clamping nuts 77 so as to secure good electrical contact.

It is to be noted that a very rigid connection between the movable contacts 65 and their insulating arms 69 is obtained by the construction illustrated in Figures 9 and 11. It is to be noted that the transverse or shouldered portions which join the intermediate part of the members 66 with the spaced portions 68, see Figure 11, are seated within notches 66' formed in the insulating arms or levers 69, see Figure 9. It is to be noted from Figures 7 and 8 that the intermediate partitions 57 are cut out and provide stops against which the spacer member 75 of the movable contact assembly strikes when the switch is in switch closed position.

The stationary contacts 43 and 47 are carried by the removable plates 56. They are of similar construction and one, namely, the contact 43, will be described. Referring to Figure 9, it will be seen that this contact includes an upstanding plate or strap like portion 78 bolted to the plate 56 by means of the bolt 79 and provided with a horizontal portion 80 terminating in upwardly extending, inwardly turned portions 81, see Figures 8 and 9. These inwardly turned portions surround the contacting part 82 of the upper contact and loosely hold it in place and furnish a pivot or rocking point for such contact. The outer ends of the contact portions 82 are upturned, as shown in Figure 9, to form a cam like guiding face for the corresponding movable contact. A headed pin 83 loosely passes through the contact portion 82 and through the horizontal portion 80 and is urged downwardly by means of a spring 84 bearing against a transverse pin 85 carried by the headed pin 83. The horizontal portion forms a lower stop to limit the downward motion of the contacting portion 82 when the movable contacts are out of engagement with the stationary contacts. It is to be noted that the movable contacts sweep in an arc very close to the inner edges of the baffles 60 and 61, and the manner in which the conductors 44 and 48, see Figure 9, are arranged causes a magnetic field to be produced which blows any arc resulting from separation of the contacts to the right into the arc chutes or spaces between the baffles and between the baffles and the body of the switch unit and thus assist materially in extinguishing the arc. For example, the conductors 44 and 48 are brought in to their respective stationary contacts in a curving sweep, as shown in Figures 4 and 9. The effect of the magnetic flux increases as the value of the current being interrupted increases.

It is to be noted from reference to Figures 7 and 10 that a cam member indicated generally at 86 is formed integrally with the sleeve portion 71 and consequently this cam is rigid with the arms 69 of the movable contacts. From reference to Figures 2, 3 and 7 it will be seen that the cam 86 is provided with an outwardly extending, curved, lower face 87 and an outwardly extending, flat, upper face 88 which meet in an outwardly projecting point 89. A hardened steel roller 90 is carried between a pair of arms 91 formed of insulating material and is freely mounted for rotation upon a pin 92 extending through such arms. The outer end of the pin 92 carries a pair of loosely, revolubly mounted, grooved, pulley like members 93, see Figure 8, over which the ends of a pair of springs 94 are hooked. The springs 94 have their inner ends hooked over the shaft 72 and thus the roller 90 is constantly urged towards the shaft 72 by means of the springs 94 and is thus held in permanent contact with the cam member 86. It is preferable to form the cam member 86 with hardened cam faces 87 and 88 upon which the roller travels, as will be apparent hereinafter.

Means are provided for moving the roller with reference to the cam 86 upon motion of the magnetic plunger. This means comprises a pair of roughly triangular-shaped levers 95, see Figure 7, pivoted upon a pin 96 carried by an inverted U-shaped metal frame 97 rigidly secured to the upper portion 53 of the switch assembly. The member 95 acts as a power transmitting member for transmitting power from the magnetically moved plunger to the roller 90. The power transmitting member 95, it will be seen, is pivoted to rock about a fixed point adjacent one of its approximate apices and is provided with a hardened steel roller 98 pivotally carried on a pin 99 adjacent another of the apices of the member 95. The third apex of the member 95 carries a pin 100 to which the upper ends of the links 91 are pivoted. The links 91, as stated, are of insulating material and so also is the power transmitting means consisting of the spaced levers 95. The lever means 95 is spring urged to rock in a counterclockwise direction by means of the spring 101.

The operation of the switch mechanism will be readily understood from a consideration of Figures 2, 3 and 7. Assume that the parts are in the position shown in Figure 2 and that an overload occurs drawing the plunger 34 downwardly and forcing the plunger 35 downwardly, thus depressing the roller 98 and the lever means 95. This causes the links 91 to draw the roller 90 upwardly towards the projecting point 89. This stretches the springs 94 and holds the movable contacts firmly in engagement with the stationary contacts as the tendency is to turn the levers 69 in a counterclockwise direction, as viewed in Figures 2, 3, 7 and 9. Just prior to the time that the roller 90 arrives at the most outwardly projecting portion of the cam 86, namely, the point 89 of the cam, the roller 98 strikes the enlarged portion 76 and thus initiates rapid opening motion of the movable contacts.

It is to be noted that at the time the roller 98 strikes the portion 76, the plunger is traveling downwardly at approximately its greatest speed as it has almost completed its downward travel and has its major portion within the winding 26. The roller 90 is thus quickly driven over the point 89 and thereafter bears on the flat face 88. The extended springs 94 pull the roller downwardly, that is to say, along the slanting face 88 of the cam 86, see Figure 7, to the position shown in Figure 3. It is obvious that this causes a quick downward rocking of the levers 69, thereby carrying the movable contacts downwardly with them and maintaining or even increasing the speed of opening of the movable contacts. It is apparent that the arms 69 tend to rock in a clockwise direction after the roller 90 passes the point 89, for it is clear that as these arms rock downwardly and the roller 90 travels to the left along the slanting face 88, this motion allows the springs 94 to contract and therefore causes the arms 69 to continue their high speed opening motion and, if anything, to increase their speed of travel in a clockwise direction.

When the winding 26 is deenergized, the spring 101 rocks the power transmitting means 95 back to the position shown in Figures 2 and 7, thus raising the plunger and causing the roller 90 to travel outwardly over the point 89 of the cam 86 onto the curved under face 87. It is clear that the arms 69 and the movable contacts will now execute a quick closing stroke, for as the arms 69 rock in a counterclockwise direction as viewed in Figures 2 and 3, the roller 90 will move along the curved face 87 of the cam 86 to a position nearer the axis of the shaft 72, and thus will allow the springs 94 to contract. Thus the switch mechanism has a quick opening and a quick closing stroke.

During the opening stroke any arc that is formed between the movable and stationary contacts is blown into channels formed by the baffles and the side and intermediate walls of the housing, see Figures 8 and 9. It will be noted that substantially individual housings composed of the side walls 54 and the adjacent intermediate walls 57 provide independent arc chutes for each pair of contacts and thus serve to house or direct the arc and keep it away from other portions of the apparatus.

The circuit breaker is constructed to provide at least one first quick opening stroke followed by subsequent opening strokes so timed that the circuit breaker has the time current characteristics of a standard fuse. Also the circuit breaker is so designed that after a predetermined number of operations occurring in rapid succession, it will lock itself out and will give a visual indication of its locked out condition. Also it is so designed that if less than the required number of operations to produce lock-out occurs, the device will reset itself so that the full number of operations are thereafter required before it will arrive at lock-out position. These functions are accomplished by means hereinbelow described. The plunger 34 does not closely fit the fiber tube 28 and the oil below the plunger within the tube 28 freely flows around the descending plunger. This displaced oil, however, passes through the passage 38 into the passage 39, see Figure 2. From Figures 12 and 13 it will be seen that the passage 39 communicates by means of a passage 102 with the upper end of a pumping cylinder 103 within which a pumping piston 104 is freely slidable. This pumping piston, as will be seen from Figure 14, is internally recessed and is urged upwardly by a light spring 105, the spring 105 being only sufficiently strong to raise the piston 104 to its uppermost position when there is no oil pressure above the piston. A passageway 106 extends from the lower end of the piston outwardly and freely communicates with the exterior oil except for the check valve 107. In other words, the oil is allowed free entrance but is prevented from passing downwardly through the passage 106. The passage 106 communicates by means of a lateral passage 108 with a counting cylinder 109, a check valve 110 preventing reverse flow of the liquid. Preferably a transverse pin 111 is located above the check valve 110 to prevent too great a displacement of the check valve. A counting piston 112 is slidably positioned within the cylinder 109 and is provided with a head portion 113 adapted to trip a toggle link mechanism in a manner hereinafter to appear. In addition to this it is to be noted that a transverse opening 114 extends between the upper portions of the cylinders 109 and 103. This opening allows free discharge of the oil above the pumping piston 104 when it is depressed to a position to uncover the opening provided, however, the counting piston 112 has not risen to a position to close the opening 114. The purpose of this arrangement will appear hereinafter as the description proceeds. The cylinder 103 also has a lateral passage 115, see Figure 13, leading to the outside oil. This passage is normally closed by means of a check valve 116 yieldingly held in place by means of a bimetal spring member 117. The bimetal spring member 117 is so made that when the oil gets colder it tends to move to the left as viewed in Figure 13 and thus lessens the spring pressure on the check valve 116. However, at no time is the spring pressure on the valve 116 completely relieved. In hot weather when the oil is heated and is thinner and is thereby rendered more fluid, the bimetal spring member 117 increases the pressure on the check valve 116.

It is to be noted that a small opening 118, see Figures 12 and 13, extends from the upper end of the cylinder 103 to a vertical passageway 119 extending downwardly and placing the upper end of the cylinder in communication with the exterior oil. This passageway is normally closed by means of an upwardly opening check valve 120, see Figure 13. It is also to be noted that the stroke of the piston 104 may be controlled by determining the upper point at which it is arrested. This is accomplished by means of the set screw 121 threaded through the cover 122 of the cylinder 103, it being noted that a suitable gasket is interposed between the cover 122 and the walls of the cylinder 103. Preferably a lock nut 123 is provided for the set screw.

A tripping member 124 formed of insulating material is mounted directly above the piston 112 and is adapted to be moved upwardly by means of the extension 113 of the piston 112, see Figure 14, when the counting piston 112 has been moved upwardly a sufficient distance following a predetermined number of operations of the circuit breaker. This insulating tripping member will be described hereinafter but for the purpose of explanation of the hydraulic mechanism it is to be noted at this time that upward motion of the member 124 causes the circuit breaker to become locked in open position against any further subsequent operations. If desired, the member 124 may be provided also for thermostatic tripping motion. This is accomplished by providing a projecting pin 125, see Figures 12, 13 and 14, which projects laterally from the member 124 and is located above a thermostatic element 126 which moves upwardly when it becomes heated. Thus upward motion of the member 126 also serves to actuate the tripping member 124 and lock the circuit breaker in open position.

The operation of the hydraulic mechanism is as follows: Assume that an overload occurs. The plunger 34 is drawn downwardly against the action of the spring urged power transmitting member 95 and makes a quick downward stroke, the oil displaced by the plunger 34 on its downward motion passing through the passageways 38, 39, see Figure 2, through the passage 102, see Figures 12 and 13, into the pumping cylinder 103. This forces the piston 104 downwardly and uncovers the passage 115, see Figure 13, and also the passage 114, see Figure 14. The oil above the piston 104 is freely discharged through the passageway 114 and also is discharged through the passageway 115 against the spring urged check valve 116. The downward motion of the piston 104 pumps oil into the cylinder 109, thus raising the counting piston 112. If the circuit breaker is designed to have one quick operation followed by subsequent operations having the time current characteristics of a fuse link, the first pumping stroke of the pumping piston 104 causes the counting piston 112 to rise to a sufficient height to completely close the escape orifice 114, see Figure 14. If, however, it is desired to have the circuit breaker execute two quick strokes before it assumes the characteristics of a fuse for subsequent operatons, then the design will be such as to require two strokes of the pumping piston 104 in order to cause the counting piston 112 to close the escape orifice 114. This may be done in several different ways by providing different sizes for the cylinders 103 and 109 if desired, or by making the counting piston 112 longer or shorter or may be accomplished by adjusting the set screw 121 so as to limit the stroke of the pumping piston 104. The adjustment of the set screw 121 also determines the number of operations for any given design of cumulative hydraulic mechanism that will occur before lock-out takes place. In addition to this the extension 113 of the counting piston 112, see Figure 14, may be varied in height. For instance, if it is desired to have lock-out occur with a smaller number of operations, the extension 113', see Figure 15, of the counting piston 112' may be made longer so as to arrive at the tripping member 124 after a smaller number of operations of the circuit breaker.

After the plunger 34 has opened the switch means, it tends to rise due to the action of the spring pressed power transmitting member 95, see Figure 2. The first portion of its rising motion is substantially unopposed as it quickly sucks oil from the cylinder 103, the piston 104 freely rising until arrested by the set screw 121, see Figure 13. The remaining portion of the upward stroke of the plunger 34 is delayed as it now has to suck oil through the restricted orifice 118, see Figure 13, the oil passing upwardly through the passageway 119 past the check valve 120. The size of the orifice 118 will determine the extent of delay between successive operations of the circuit breaker.

Assume that the fault persists and the escape orifice 114, see Figure 14, is closed by the counting piston 112. The plunger 34 is again drawn downwardly, thus opening the switch means but the operation of the circuit breaker is not a substantially instantaneous operation but assumes substantially the time current characteristics of a fuse. This is caused by the restriction imposed by the spring bimeal member 117, see Figure 13, which causes the check valve 116 to offer a predetermined degree of resistance to the flow of oil outwardly through the passage 115 which is now the only discharge passage for the oil displaced by the plunger 34. By having the spring member 117 formed as a bimetal element correction is obtained due to change in the viscosity of the oil for change in temperature, thus maintaining the time current characteristics of a fuse irrespective of variations in temperature.

After the circuit breaker has executed a predetermined number of operations in quick succession, the counting piston 112 has risen a sufficient height to trip the trip member 124 and cause lock-out of the circuit breaker, the mechanism hereinafter described being so arranged as to hold the circuit breaker in open position when it is locked out.

For different current ratings different coils 26 are provided. For variations of time delay during the downward movement of plunger 34, and thus for variations of time current characteristics, a more or less flexible bimetal member 117 is provided.

The cap 2 of the circuit breaker is provided with a transverse shaft 127 which is provided with an eyeleted, manually operable handle 128 on the outer side of the cap, such handle being positioned within an open bottom housing 129 and normally being hidden by the housing. The operating handle 128 is adapted to be displayed as indicated in the dash line of Figure 3 when the circuit breaker is locked out. The circuit breaker is adapted to be manually opened when the handle 128 is pulled downwardly as by means of a switch stick for instance. The circuit breaker is adapted to be reset when the handle is pushed upwardly as for example by means of a switch stick. The circuit breaker is trip free and will operate no matter whether the handle is held or is being moved back to resetting position. A small lever 130 is rigidly mounted on the shaft 127, see Figures 2, 3 and 4. This small lever 130 is provided with an outwardly projecting pin 131 to which one end of a spring 132 is attached. The other end of the spring is attached to a projecting pin 133 carried by a bell crank lever 134 loosely mounted on the shaft 127. The bell crank lever 134 is provided with a shouldered portion 135 against which the lever 130 normally bears. A second bell crank lever 136 is loosely mounted on the shaft 127. One end of the bell crank lever 136 is connected by means of an insulating link 137 with the upper end of the plunger 34. The other end of the bell crank lever 136 is positioned in line with a projecting pin 138 carried by the bell crank lever 134. An inverted channel-shaped link 139 connects the bell crank 134 and the tripping member 124 and is pivoted to such members by means of the pins 138 and 139' respectively.

The tripping member 124 is pivotally mounted as indicated at 140, see Figures 2 and 3, and constitutes with the link 139 a toggle link mechanism. The channel-shaped link 139 has a projecting portion that normally rests on the top of the tripping member 124 when the toggle link is extended and is slightly past dead center, as shown in Figure 2. This, therefore, prevents downward collapse of the toggle link mechanism. A spring 141 extends between the pins 138 and 140 and urges the toggle link mechanism towards collapsing motion. When the toggle link mechanism is collapsed in an upward direction from the position shown in Figure 2 to the position shown in Figure 3, the bell crank lever 134 is rocked in a counterclockwise direction and the pin 138 strikes the bell crank lever 136 and forces the plunger 34 downwardly, thus opening the circuit breaker and locking the circuit breaker in open position.

As has been previously described it is to be understood that the tripping member 124 is tripped by the cumulative hydraulic mechanism after a predetermined number of operations of the circuit breaker occurring in rapid succession, and when this has happened, the circuit breaker is locked in open position. It may be manually reset by means of the eyeleted handle 128 which may be engaged by a switch stick. This eyeleted handle is rigidly mounted on the shaft 127 and is normally hidden or housed within the housing 129. However, when the circuit breaker is locked out as shown in Figure 3, the handle assumes an indicating position as shown in the dash line in Figure 3. In order to reset the circuit breaker the operator merely engages the eyelet of the handle 128 with a switch stick and pushes the handle upwardly from the position shown in Figure 3 to the position shown in Figure 2. This straightens out the toggle link mechanism composed of the members 139 and 124 and allows the toggle to drop slightly past dead center under the influence of gravity to the position shown in Figure 2. Thereafter when the operator removes the switch stick from the handle 128, the spring 141 tends to collapse the toggle link mechanism in a downward position from that shown in Figure 2. This, as previously stated, is resisted by the portion of the channel like link 139 which overlaps the tripping member 124 and thus prevents downward tripping motion.

The circuit breaker may be tripped and locked out by means of the thermostatic member 126 as previously described. Also the circuit breaker is adapted to be manually opened by means of the handle 128. The operator merely engages the eyelet of the handle by the switch stick and pulls down on the handle. This rocks the small lever 130, see Figure 2, in a counterclockwise direction against the action of the spring 132. The lever 130 passes beneath the link 139 of the toggle link mechanism and causes the link 139 to pivot about the pin 138 and raise the knee of the toggle, thus allowing the spring 141 to complete the collapse of the toggle link mechanism.

It is to be noted from the previous description of the switch mechanism that no matter how the circuit breaker is opened, whether manually, thermally or by the action of the cumulative hydraulic mechanism, that the switch mechanism executes a very quick opening stroke. Also no matter how slowly the handle may be pushed back from its exposed position corresponding to the position of the parts shown in Figure 3 to that shown in Figure 2, nevertheless the switch mechanism closes with a quick motion.

If desired a counter 142, see Figure 6, may be positioned within the hood 129 and may have a manipulating lever 142' which is operated by means of a crank 143 carried by a small rock shaft 144 extending inwardly and provided with a lever 145 at its inner end, see Figure 4. The lever 145 is positioned in line with a projecting pin 146, see Figure 2, which pivotally joins the bell crank lever 136 with the upper end of the insulating link 137.

Figure 16:
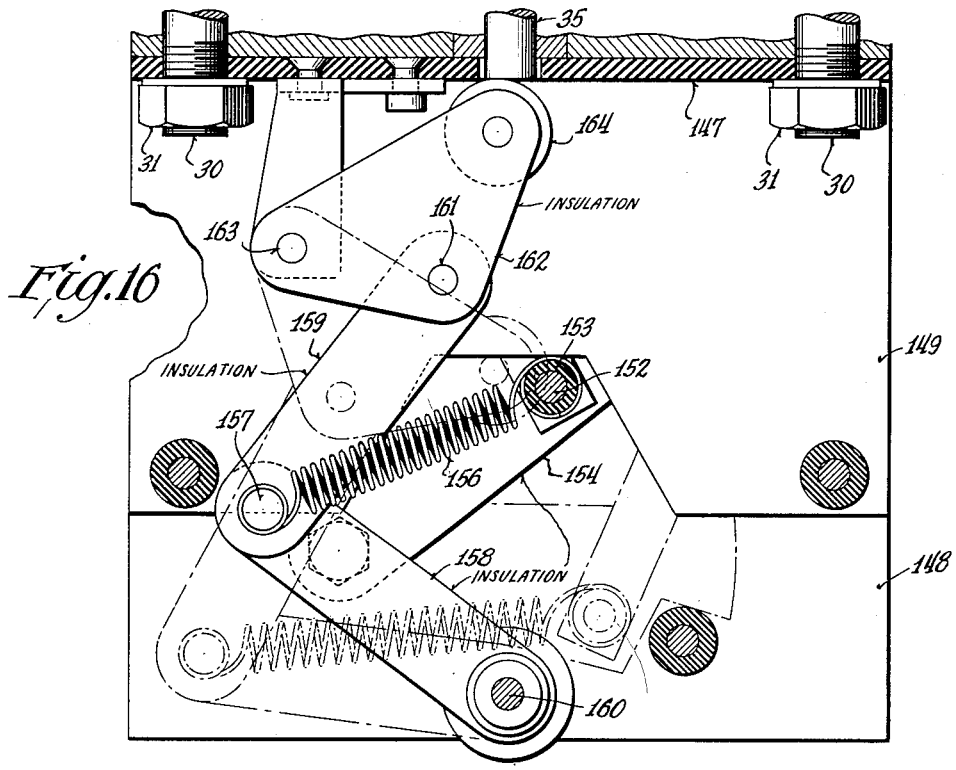
Figure 16 is a view corresponding to Figure 7 showing a modified form of the invention and showing in full lines the position of the parts when the switch is closed and in dotted lines the position of the parts when the switch is open.
Figure 17:
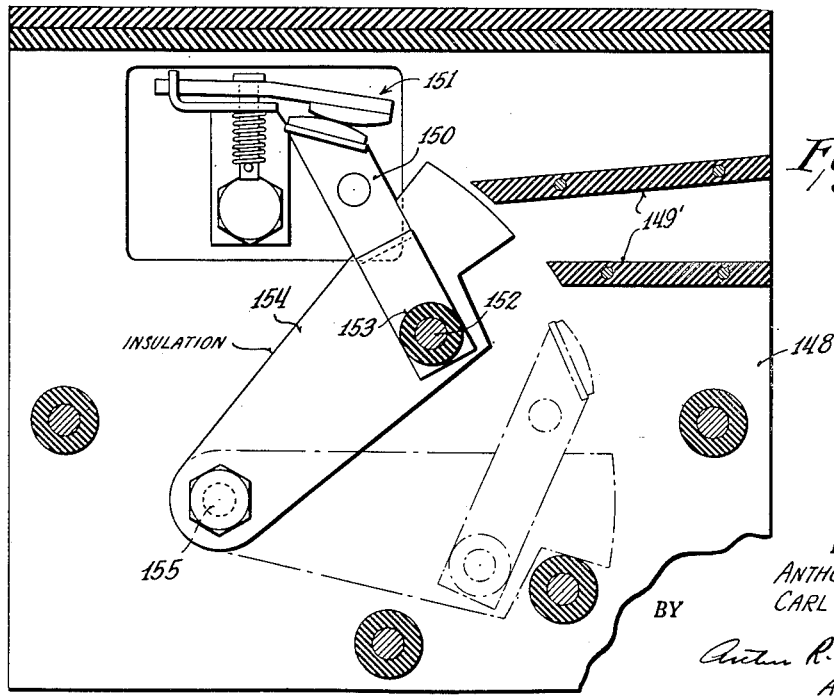
Figure 17 is a sectional view showing one of the stationary contacts and one of the movable contacts in switch closed position.

Figures 16 and 17 show a further form of switch mechanism. The insulating housing therefor has a top portion 147, main side walls 148, and intermediate partition walls 149 corresponding to the portions 53, 54 and 57 of Figure 8. Baffles 149', see Figure 17, are positioned between the intermediate partitions 149 and the side walls 148 and correspond to the baffles 60 and 61 previously described.

The construction of movable and stationary contacts in this form of the invention is substantially the same as that previously described. The movable contacts are indicated by the reference character 150 and the stationary contacts are indicated by the reference character 151. Only one set of contacts has been shown in Figure 17 but it is to be understood that the contacts are duplicated on each side of the device as shown in Figure 8 for the first form of the invention. The movable contacts 150 are electrically connected by means of the connecting rod 152 provided with an insulating shield 153. The movable contacts are carried by insulating levers 154 pivoted as indicated at 155. The insulating shield or spacer 153 is revolubly mounted on the rod 152 and the outer ends of a pair of springs 156, see Figure 16, are hooked over the spacer 153 and the curved or hooked ends are positioned within grooves formed in the spacer 153. The inner ends of the springs 156 are hooked around a pivot pin 157. The pivot pin 157 joins a pair of insulating levers 158 with a pair of insulating links 159. The insulating levers 158 are pivotally mounted at a stationary point as indicated at 160 and the insulating links 159 are pivotally joined as indicated at 161 to a pair of spaced insulating members 162 which constitute power transmitting means and which are pivoted as indicated at 163 at a stationary point and which carry a hardened steel roller 164 against which the plunger 35 of the electromagnetic means is adapted to bear. It is to be noted that when the switch is in closed position as shown in Figures 16 and 17 the notched out portion of the intermediate partitions 149 constitutes a stop and engages the insulating sleeve 153.

The operation of this form of the invention is as follows: When an overload occurs, the plunger 35 moves downwardly and rocks the power transmitting means 162 from the full line position shown in Figure 16 to the dotted line position shown in such figure and causes the switch to execute quick opening motion. The springs 156 are now effective to cause return of the plunger to its uppermost position in a manner which will appear hereinafter. The springs 156 also cause a quick closing stroke to be executed by the movable contacts.

Assume that the parts are in the full line position shown in Figure 16, which corresponds to the full line position shown diagrammatically in Figure 18. As the plunger 35 descends, it will rock the member 162 and through the medium of the link means 159 will rock the lever means 158. As the plunger nears the final portion of its downward stroke, the roller 164 strikes the insulating shield 153 and causes the initial quick opening stroke of the movable contacts, as it will be recollected from the previous description that the plunger is executing very rapid motion as it nears the limit of its downward stroke. At approximately the same time it will be seen that the center line of the springs 156 crosses the pivot point 155 of the switch arms or levers 154. Further downward motion of the plunger causes the center line of the springs 156 to pass the pivot point 155 and consequently the switch is urged by means of the springs 156 to continue opening motion and the speed at which its opening stroke was initiated, as pointed out above, is maintained or even increased by the action of the springs 156. The parts now move to their fully open position as shown in full lines in Figure 19 in the diagrammatic view and as shown in dotted lines in Figure 16. The dotted line position in Figure 18 is an intermediate position and not the final position.

The springs 156 are effective to raise the plunger 35. It is to be noted from an examination of the diagrammatic view of Figure 19 that the springs 156 will cause the lever means 158 to rock about the pivot 160. As the upward motion continues it is to be noted that the center line of the spring means 156 crosses the pivot 155 of the switch arms or levers 154. This position is shown in dotted lines in Figure 19. On continued upward motion of the lever means 158 the line of pull of the spring crosses over the pivot 155 of the switch arms 154 and consequently the movable contacts are quickly moved to switch closed position.

Instead of using the lever means 158, cam means could be employed to guide the pivot point 157 in any desired direction. Instead of having the pivot point 157 follow along a curved or arcuate path as shown in Figures 18 and 19, it could be made to follow an initially curved path and thereafter a straight path by means of the curved upper portion 165 and the straight lower portion 166 of a cam member 167 upon which a roller 168 rides, the roller 168 being mounted on the pivot 157. This construction may be employed to give a greater extension to the spring means 156 when the switch is executing opening motion. A comparison of Figures 19 and 20 will show that the spring means 156 is extended a greater amount in the form shown in Figure 20 than in the form shown in Figure 19. This expedient may be employed to have a greater spring force acting on the switch means for its opening stroke. However, the pivoted levers 158 shown in Figures 18 and 19 are preferable to the cam means 167.

It will be seen that in the first form of the invention shown in Figures 2, 3, 7 and 8, the spring 101 is so arranged that it overpowers the effect of the spring 94 when the switch means is being moved through the first portion of the closing motion of the switch means until the roller 90 rides over the point of the cam 86. However, in the forms of the invention shown in Figures 16 through 20 the same spring means is employed to actuate the switch contacts for completing their opening stroke and for executing their closing stroke and also for raising the plunger of the electromagnetic means.

The contacts and associated operating mechanism forms the subject matter of our copending application Serial No. 592,414, filed May 7, 1945, now Patent No. 2,555,168, May 29, 1951, for Circuit Breakers.

The same type of electromagnetic means and hydraulic means are employed for all forms of the invention. The hydraulic means is so constructed that there is sufficient leakage around the counting piston that it will settle back to its initial position if there are not a sufficient number of operations for tripping or if they do not not recur with sufficient rapidity so that the device will reset itself for the full number of operations.

In all forms of the invention the switch construction is a unitary structure and may be removed or replaced as a unit without disturbing other portions of the apparatus. Also it is to be noted that new coils or windings can be substituted whenever desired with a minimum disturbance of the parts of the device, it being merely necessary to disconnect the coil and remove the switch means as a unit and thereafter remove the coil. Also it is to be noted that the entire mechanism is suspended from the cover or cap and may be lifted bodily from the can for inspection or repair.

Although this invention has been described in considerable detail, it is to be understood that such description is intended as illustrative rather than limiting as the invention may be variously embodied and is to be interpreted as claimed.

We claim:

1. An automatic reclosing circuit breaker comprising switch means, normally quick acting switch operating means for opening said switch means in response to overload, means for reclosing said switch means, a first hydraulic means actuated by said switch operating means when said switch operating means moves towards switch open position, said hydraulic means including a discharge portion, and a second hydraulic means effective after at least one opening motion of said switch means for constricting the discharge portion of said first mentioned hydraulic means to cause a delayed response of said switch operating means to overload.

2. An automatic reclosing circuit breaker comprising switch means, normally quick acting switch operating means responsive to overload for operating said switch means, means for automatically altering the action of said switch operating means to cause a slower response of said switch operating means to overload after at least one quick operation, lock-out means for locking the circuit breaker in open position after a predetermined number of operations occurring in quick succession, cumulative means for controlling said lock-out means, and adjustable means for varying the number of slower operations.

3. An automatic reclosing circuit breaker comprising switch means, normally quick acting switch operating means responsive to overload for operating said switch means, means for automatically altering the action of said switch operating means to cause a slower response of said switch operating means to overload after at least one quick operation, lock-out means for locking said circuit breaker in open position after a predetermined total number of operations occurring in quick succession, and means for varying the total number of operations at which said lock-out means will lock said circuit breaker in open position.

4. An automatic reclosing circuit breaker comprising switch means, normally quick acting switch operating means for opening said switch means in response to overload, means for reclosing said switch means, hydraulic means actuated by said switch operating means when said switch operating means moves towards switch open position, said hydraulic means including a discharge portion, a valve, bimetal spring means controlling said valve, and means effective after at least one opening motion of said switch means for forcing said hydraulic means to discharge past said valve.

5. In an automatic reclosing circuit breaker, separable contacts, electroresponsive means for causing separation of said contacts in response to a predetermined electrical condition of the circuit, said contacts automatically reclosing in response to a circuit interrupting operation, means responsive to a sequence of a predetermined number of closely successive circuit interrupting operations to cause said contacts to remain separated, fluid dashpot means for delaying separation of said contacts a predetermined time after the occurrence of said predetermined condition and for delaying reclosure of said contacts a predetermined time after a circuit interrupting operation, said dashpot means being normally vented so that on the first interrupting operation of any such sequence of circuit interrupting operations said contacts will be separated substantially instantaneously, means responsive to such a first interrupting operation for closing said vent so that all reclosing operations and subsequent interrupting operations will be delayed by said dashpot means, and means responsive to the lapse of a predetermined time, at least after any reclosing operation in such a sequence of operations, for restoring said dashpot means to its normal vented condition.

6. In an automatic reclosing circuit breaker, separable contacts, electroresponsive means for causing separation of said contacts in response to a predetermined electrical condition of the circuit, said contacts automatically reclosing in response to a circuit interrupting operation, means responsive to a sequence of a predetermined number of closely successive circuit interrupting operations to cause said contacts to remain separated, fluid dashpot means for delaying separation of said contacts a predetermined time after the occurrence of said predetermined condition, said dashpot means being normally vented so that on the first interrupting operation of any such sequence of circuit interrupting operations said contacts will be separated substantially instantaneously, means responsive to a predetermined interrupting operation for closing said vent so that subsequent interrupting operations will be delayed by said dashpot means, and means responsive to the lapse of a predetermined time, at least after any reclosing operation in such a sequence of operations, for restoring said dashpot means to its normal vented condition.

7. In an automatic reclosing circuit breaker, separable contacts, electroresponsive means having lost motion with respect to said contacts for separating said contacts in response to a predetermined electrical condition of the circuit, said contacts automatically reclosing in response to a circuit interrupting operation, fluid dashpot means having a part movable with said electroresponsive means for delaying movement of said electroresponsive means at least during movement thereof relative to said contacts to thereby delay separation of said contacts a predetermined time after the occurrence of said predetermined electrical condition, means responsive to a sequence of a predetermined number of closely successive circuit interrupting operations for causing said contacts to remain separated, means for venting said dashpot means on at least one predetermined circuit interrupting operation of any such sequence of operations, and means for constricting the venting of said dashpot means on at least one other predetermined circuit interrupting operation whereby on said one predetermined operation the contacts are separated substantially instantaneously upon the occurrence of said predetermined electrical condition, and on another operation of any such sequence of operations said dashpot means is effective to delay separation of said contacts.

8. In an automatic reclosing circuit breaker, separable contacts, electroresponsive means for causing separation of said contacts in response to a predetermined electrical condition of the circuit, said contacts automatically reclosing in response to a circuit interrupting operation, means responsive to a sequence of a predetermined number of closely successive circuit interrupting operations to cause said contacts to remain separated, fluid dashpot means for delaying separation of said contacts a predetermined time after the occurrence of said predetermined condition, a vent for said dashpot means, valve means controlling said vent, means responsive to at least one interrupting operation of said breaker for operating said valve means, whereby separation of said contacts will occur at different times after the occurrence of said predetermined conditions on said one interrupting operation and at least the closely succeeding interrupting operation, and means for operating said valve means to its original position following said one interrupting operation in the event a closely succeeding interrupting operation does not occur.

9. In an automatic reclosing circuit breaker, separable contacts, electroresponsive means for causing separation of said contacts in response to a predetermined electrical condition of the circuit, said contacts automatically reclosing in response to a circuit interrupting operation, means responsive to a sequence of a predetermined number of closely successive circuit interrupting operations to cause said contacts to remain separated, fluid dashpot means having a movable part actuated at least during a part of each circuit interrupting operation, means rendering said dashpot means ineffective to delay at least one predetermined circuit interrupting operation of any such sequence of operations whereby at least on said one operation the contacts are relatively quickly separated after the occurrence of said predetermined electrical condition, means responsive to a predetermined operation in any such sequence of operations to render said dashpot means effective to delay the next succeeding circuit interrupting operation of such sequence, and means rendering said last-mentioned means ineffective after the lapse of a predetermined time.

10. In a circuit interrupter including separable contacts, means for separating said contacts, said means comprising a solenoid in series with said contacts, a dashpot surrounded by said solenoid and having a discharge-intake port normally allowing free discharge therethrough, a magnetic piston reciprocable in said dashpot and connected with at least one of said contacts for separating it from the other of said contacts, biasing means normally holding said piston in a position outwardly with respect to said dashpot and with said contacts closed, normally inactive lockout means for holding said contacts separated after a series of circuit opening operations, and cumulative means responsive to circuit opening operations for rendering said lockout means active, said cumulative means serving as a valve closing said port after a series of circuit opening operations, whereby a subsequent circuit opening operation will be delayed.

11. In a circuit interrupter, contact means, means for opening said contact means, said last mentioned means comprising a solenoid in series with said contact means, a dashpot surrounded by said solenoid and having a discharge port normally allowing free discharge therethrough, a magnetic piston reciprocable in said dashpot and operatively connected to said contact means for opening said contact means, biasing means normally holding said piston in a position outwardly with respect to said dashpot and with said contact means closed, normally restrained lockout means biased towards lockout position for holding said contact means open when said lockout means is released, and cumulative means responsive to circuit opening operations for restricting said port when advanced a predetermined distance, said cumulative means having means for releasing said lockout means when advanced to its maximum position.

12. A circuit interrupter comprising a magnetic plunger structure arranged to occupy a first and a second position, a solenoid for moving said magnetic plunger structure in one direction from said first position towards said second position upon the occurrence of an overload, switch means having an operating member continuously in engagement with said magnetic plunger structure and arranged to open when said magnetic plunger structure is moved in said one direction to said second position, over-center lock-out means normally held on one side of center and movable to the other side of center and arranged to hold said switch means open through the medium of said magnetic plunger structure when moved to the said other side of center, means responsive to a plurality of operations of said circuit interrupter occurring in rapid succession for moving said over-center lock-out means to said other side of center, and energy transmitting means for transmitting energy from said lock-out means to said magnetic plunger structure to hold said magnetic plunger structure in said second position thereby holding said switch means open when said over-center lock-out means is moved to said other side of center.

13. A circuit interrupter comprising a magnetic plunger structure arranged to occupy a first and a second position, a solenoid for moving said magnetic plunger structure in one direction from said first position towards said second position upon the occurrence of an overload, switch means having an operating member continuously in engagement with said magnetic plunger structure and arranged to open when said magnetic plunger structure is moved in said one direction to said second position, over-center lock-out means normally held on one side of center and movable to the other side of center and arranged to hold said switch means open through the medium of said magnetic plunger structure when moved to the said other side of center, means responsive to a plurality of operations of said circuit interrupter occurring in rapid succession for moving said over-center lock-out means to said other side of center, energy transmitting means for transmitting energy from said lock-out means to said magnetic plunger structure to hold said magnetic plunger structure in said second position thereby holding said switch means open when said over-center lock-out means is moved to said other side of center, and biasing means biasing said magnetic plunger structure towards its first position.

ANTHONY VAN RYAN.
CARL SCHINDLER.

REFERENCES CITED

The following references are of record in the file of this patent:

UNITED STATES PATENTS

| Number | Name | Date |
| --- | --- | --- |
| 400,463 | Law | Apr. 2, 1889 |
| 420,096 | Pfluger | Jan. 28, 1890 |
| 508,652 | Thomson | Nov. 14, 1893 |
| 1,033,900 | Janette | July 30, 1912 |
| 1,166,055 | Keyes | Dec. 28, 1915 |
| 1,479,580 | Barnus et al. | Jan. 1, 1924 |
| 1,648,508 | Schweitzer | Nov. 8, 1927 |
| 1,945,568 | Rossman et al. | Feb. 6, 1934 |
| 1,972,907 | Shaw | Sept. 11, 1934 |
| 2,021,427 | Peo | Nov. 19, 1935 |
| 2,096,402 | Molloy | Oct. 19, 1937 |
| 2,100,893 | Anderson | Nov. 30, 1937 |
| 2,311,714 | Thompson et al. | Feb. 23, 1943 |
| 2,314,995 | Lennholm | Mar. 30, 1943 |
| 2,321,122 | Birkenmaier et al. | June 8, 1943 |
| 2,333,604 | Wallace | Nov. 2, 1943 |
| 2,337,949 | Walle | Dec. 28, 1943 |
| 2,414,786 | Lincks et al. | Jan. 21, 1947 |